US005694458A

United States Patent [19]
Okada et al.

[11] Patent Number: 5,694,458
[45] Date of Patent: Dec. 2, 1997

[54] FACSIMILE MAIL SYSTEM

[75] Inventors: Akihiro Okada; Hirotaka Tashima, both of Kawasaki, Japan

[73] Assignee: Fujitsu Limited, Kanagawa, Japan

[21] Appl. No.: 571,153

[22] Filed: Dec. 12, 1995

[30] Foreign Application Priority Data

May 10, 1995 [JP] Japan .................... 7-111783

[51] Int. Cl.$^6$ .................... H04M 11/00; H04M 1/32
[52] U.S. Cl. .................... 379/100; 358/402; 358/442
[58] Field of Search .................... 379/100, 96–98; 358/400, 402, 403, 407, 434, 442, 468

[56] References Cited

U.S. PATENT DOCUMENTS 5,257,112  10/1993  Okada .................... 379/100

FOREIGN PATENT DOCUMENTS 2134043  5/1995  Japan .
5207257  8/1995  Japan .

Primary Examiner—Wing F. Chan
Attorney, Agent, or Firm—Helgfott & Karas, P.C.

[57] ABSTRACT

A facsimile mail system including subscriber terminals, an exchange and a facsimile mail apparatus. Given a request from a subscriber terminal for connection to the facsimile mail apparatus, the exchange adds an originator identification number to that necessary information about a mail service which is entered from the subscriber terminal. The necessary information supplemented by the originator identification number is transferred from the exchange to the facsimile mail apparatus where the information is converted to a mail function code for internal processing. As per internally stored information, the facsimile mail apparatus decides whether or not to permit the connection. When the connection is permitted, a connection enable response is returned to the exchange. In turn, the exchange establishes a line connection between the subscriber terminal in question and the facsimile mail apparatus.

7 Claims, 10 Drawing Sheets

FACSIMILE MAIL SYSTEM

BACKGROUND OF THE INVENTION

1. Field of the Invention

The present invention relates to a facsimile mail system and, more particularly, to a method for access to a facsimile mail apparatus.

2. Description of the Related Art

The facsimile mail system works when facsimile information (simply called fax information hereunder) is sent from a user via an exchange to a mail center equipped with a facsimile mail apparatus (simply called the fax mail apparatus hereunder). With the fax information thus received, the system temporarily accommodates it in the fax mail apparatus before transmitting it to its destination(s), i.e., one or a plurality of facsimile terminals (simply called fax terminals hereunder). When a user accesses such a fax mail apparatus to make use of its mail service, it is desired to simplify the operations at the fax terminal as well as to make sure that the request for the mail service is carried out unfailingly.

Conventionally performed operations for accessing the fax mail apparatus will now be outlined below, starting with the case in which a G3 mode fax terminal (simply called the G3 fax terminal hereunder) accesses the fax mail apparatus. In this case, one of two access methods is used to designate the access: by utilizing a PB (push-button) signal, or by resorting to an OMR (optical mark reader) sheet.

According to the method of utilizing the PB signal for access designation, the user initially places a call from his fax terminal to the mail center to establish a line connection with the fax mail apparatus. The user then inputs the necessary parameters of the mail service using the PB signal, and pushes a start button to initiate facsimile transmission. For example, the user first inputs using keys the telephone number of the fax mail apparatus at the mail center (e.g., 044-754-4234). When a line is connected, the mail center gives the user vocal guidance acknowledging the line connection. In response, the user inputs his ID number (e.g., 2000#) followed by a relevant mail transmission function code (e.g., 100#). The user then enters the telephone number of the destination fax terminal (e.g., 03-2223-2222), and pushes the facsimile transmission start button.

According to the method of using the OMR sheet for access designation, the user initially marks the destination and other relevant information with a pencil on an OMR sheet (known as a mark sheet). An image of the sheet thus marked is sent to the fax mail apparatus as the first page of the target document to be transmitted. The fax mail apparatus recognizes the markings of the sheet and carries out the requested processing accordingly. For example, the user first sets on his fax terminal a document comprising the marked OMR sheet as its first page. The user then inputs the telephone number of the fax mail apparatus (e.g., 044-754-4234) and presses the facsimile transmission start button.

How a G4 mode fax terminal (simply called the G4 fax terminal hereunder) accesses the fax mail apparatus will now be outlined. This kind of access is accomplished by one of two methods: by using an OMR sheet, or by resorting to a specific communication procedure for access designation. The method of using the OMR sheet for access designation is the same as that discussed above in connection with the G3 mode case.

The method of using the specific communication procedure for access designation is valid only with specialized G4 mode fax terminals for mail access purposes. In this case, the user simply pushes a mail button and then enters the desired party's telephone number. This makes the mail service available. For example, the user pushes the mail button, inputs the other party's telephone number (e.g., 03-2223-2222) and then pushes the facsimile transmission start button.

In the above-described case in which the G3 fax terminal accesses the fax mail apparatus by use of the PB signal, a large number of input operations are involved. If the operating manual is not at hand, the user can make input errors more frequently during the input and it can take longer to complete the request procedure. If the line being used is a DP (dial pulse) line, an additional step of switching to tone signal generation further complicates the operating procedure.

Where the OMR sheet is used for access from the G3 fax terminal, the marked sheet needs to be used every time a facsimile transmission is carried out. This means that the time required for every transmission is always prolonged by one extra page, with the concomitant increase in transmission costs. If the markings on the sheet are blurred or smeared or if the sheet is not properly set, the request procedure is not carried out.

In the G4 mode in which G4 fax terminals operate, analog signals such as the PB signal cannot be used for access designation. If the OMR sheet is used for access, a snag can develop in a half-tone transmission in which dot roughness is changed for density gradation as in the G3 mode. In that case, some fax terminals are incapable of recognizing the markings because the latter are represented in dots or in mosaic. This makes it impossible to carry out the request procedure. Although the access operation based on the specific communication procedure is easy to perform, it applies only to the specialized G4 fax terminals for mail access and not to other G4 mode terminals.

SUMMARY OF THE INVENTION

It is therefore an object of the present invention to provide a facsimile mail system designed to simplify the user's operations when a facsimile mail service is utilized.

It is another object of the invention to provide a facsimile mail system that ensures unfailing execution of a mail service request in cooperation with an exchange.

In accordance with an aspect of the present invention, there is provided a facsimile mail system including a plurality of subscriber terminals, a facsimile mail apparatus and an exchange for connecting said subscriber terminals to said facsimile mail apparatus, said facsimile mail system comprising: adding means attached to said exchange, for adding an originator identification number to necessary information about a mail service entered from one of said subscriber terminals in response to a connection request from said one subscriber terminal; transmitting means, attached to said exchange, for transmitting to said facsimile mail apparatus said necessary information about said mail service supplemented with said originator identification number; converting means attached to said facsimile mail apparatus, for converting said necessary information coming from said exchange into a mail function code for internal processing; and connecting means, attached to said exchange, for connecting said one subscriber terminal to said facsimile mail apparatus upon receipt of a connection enable response sent from said facsimile mail apparatus.

In a preferred structure according to the invention, the necessary information about the mail service comprises a number allocated to the fax mail apparatus, a mail function number, and the telephone number of a destination party.

According to the invention, the necessary information about the mail service entered from any subscriber terminal is supplemented with an originator identification number by the exchange. The exchange then forwards to the fax mail apparatus the information about the mail service supplemented with the originator identification number. This allows the user at his subscriber terminal to access the fax mail apparatus by performing a simple operation of entering the necessary information about the facsimile mail service, with no need to verify whether a line connection is established.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Figure 1:
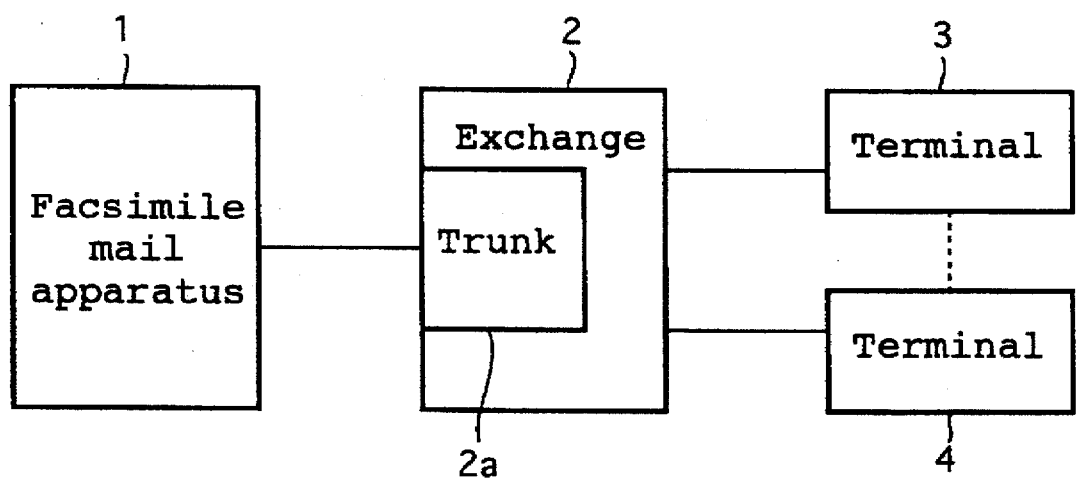
FIG. 1 is a block diagram sketching the operating principle of this invention.

FIG. 1 is a block diagram sketching the operating principle of this invention. The fax mail system in FIG. 1 operates basically as follows: When a subscriber terminal 3 or 4 issues a request for connection to a fax mail apparatus 1, an exchange 2 transfers to the fax mail apparatus 1 both necessary information about a mail service entered from the terminal in question and an originator identification number added to the information by the exchange 2. With the transfer completed, a line connection is established between the subscriber terminal 3 or 4 and the fax mail apparatus 1. Preferably, the exchange 2 and the fax mail apparatus 1 are connected so that the necessary information about the service entered from the subscriber terminal 3 or 4 and the originator identification number added by the exchange 2 will be transferred via a trunk 2a of the exchange 2.

Figure 2:
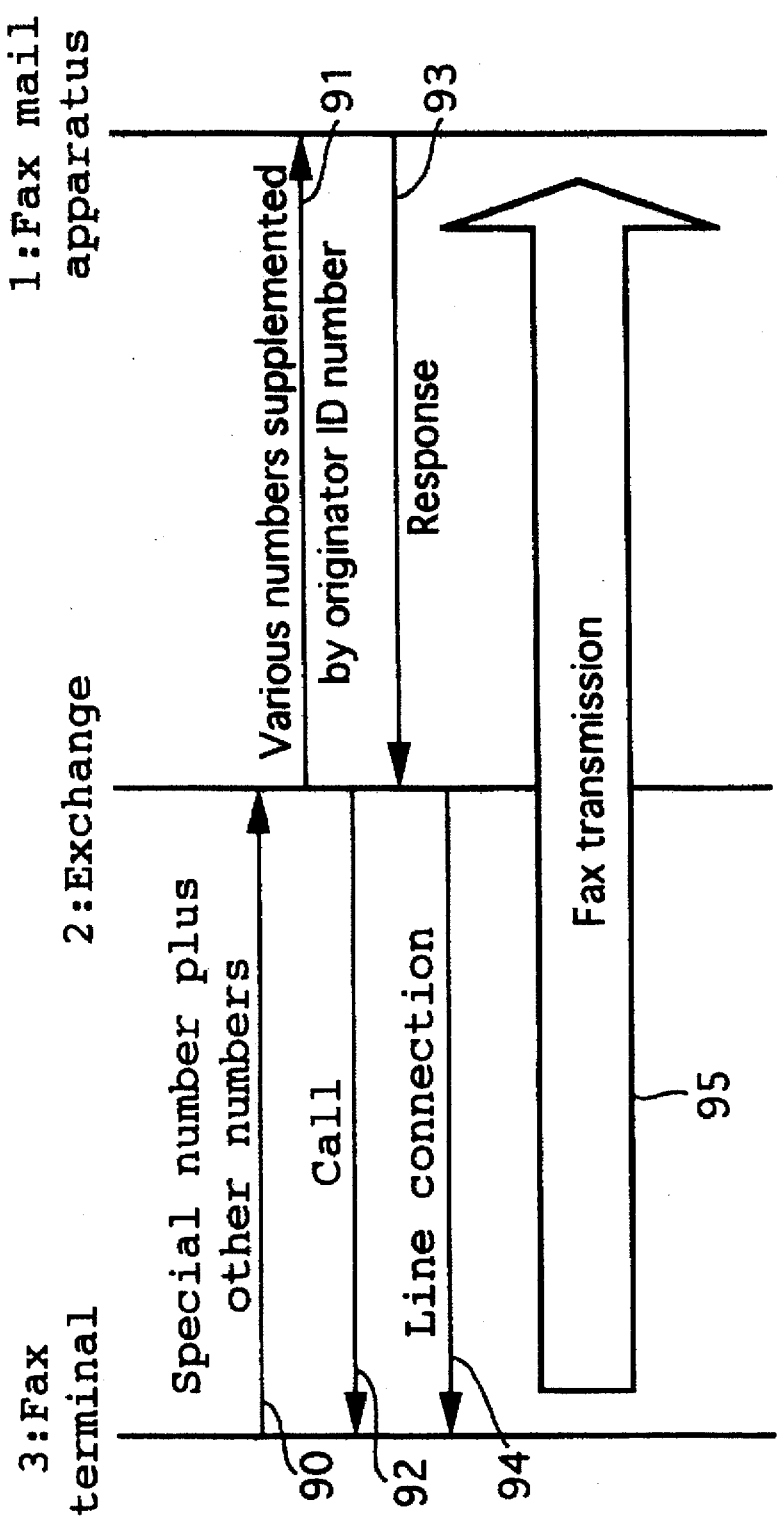
FIG. 2 is a sequence chart depicting how a fax transmission takes place.

In the fax mail system according to the invention, the originator first enters from the fax terminal 3 (subscriber terminal) a special number (allocated to the fax mail apparatus), a mail function number, and the telephone number of a desired destination party, as indicated by reference numeral 90 in FIG. 2. These numbers are sent to the exchange 2 which in turn adds the originator identification number to the received information. As indicated by reference numeral 91, the exchange 2 then transmits to the fax mail apparatus 1 the originator identification number and other relevant numbers (mail function number and the destination party's telephone number). Concurrently the exchange 2 transmits a calling voice signal to the fax terminal 3, as shown by reference numeral 92. When a line is acquired, the fax mail apparatus 1 gives a response to the exchange 2 as indicated by reference numeral 93. Given the response, the exchange 2 establishes a line connection between the fax terminal 3 and the destination party's fax terminal, as shown by reference numeral 94. With the line connection established, pushing a facsimile start button on the fax terminal 3 executes a facsimile transmission as indicated by reference numeral 95. Thus the originator can access the fax mail apparatus by carrying out a simple operation of entering the necessary information about the mail service.

Figure 3:
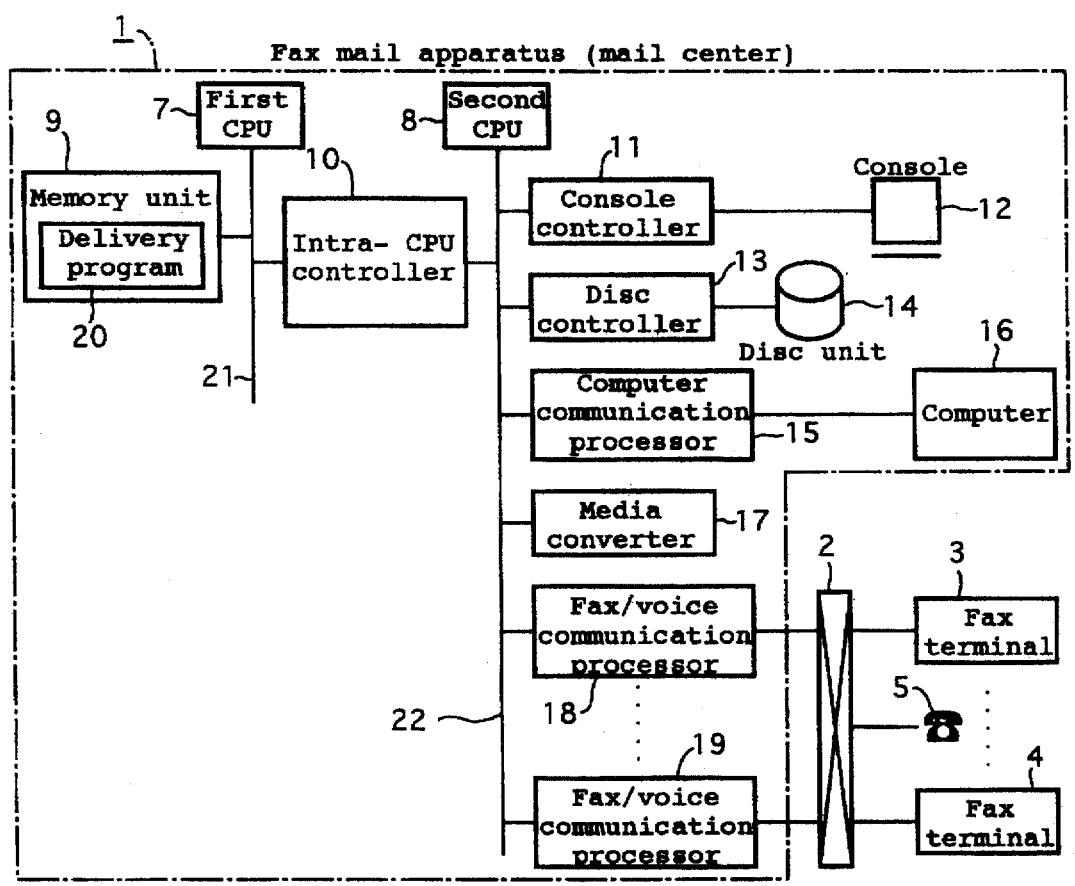
FIG. 3 is a block diagram of a fax mail system embodying the invention.

FIG. 3 is a block diagram of a facsimile mail system embodying the invention. In FIG. 3, reference numeral 1 is a fax mail apparatus installed at the mail center; 2 is an exchange; and 3 through 4 are subscribers' fax terminals. The fax mail apparatus 1 is connected with numerous fax terminals 3 through 4 via the exchange 2 to which a subscriber telephone set 5 is connected. It is assumed that the fax terminals 3 through 4 are a mixture of G3 and G4 mode terminals.

In the fax mail apparatus 1, reference numeral 1 is a first CPU; 8 is a second CPU; 9 is a memory unit; 10 is an intra-CPU controller; 11 is a console controller; 12 is a console; 13 is a disc controller; 14 is a disc unit; 15 is a computer communication processor; 16 is a computer; and 17 is a media converter. Reference numerals 18 and 19 denote a fax (facsimile)/voice communication processor each, which is specific to this embodiment of the invention. The internal structure of the fax/voice communication processor will be described later with reference to FIGS. 4 and 5. The memory unit 9 in FIG. 3 holds a delivery program 20 for executing mail delivery processing which is also specific to this embodiment and which will be discussed later.

The components of the fax mail apparatus 1 in FIG. 3 are connected to a bus 21 of the first CPU 7 and to a bus 22 of the second CPU 8. The first CPU 7 runs programs including the delivery program 20 to support the operating procedure of the fax mail apparatus 1 and to control different ways to transmit fax information, such as "confidential" and "special delivery." The second CPU 8 controls data input and output to and from the console controller 11, disc controller 13, computer communication processor 15, media converter 17 and fax/voice communication processors 18 through 19 which are connected to the bus 22.

The intra-CPU controller 10 transmits to the first CPU 7 the data acquired by hardware operating under I/O control of the second CPU 2 and hooked up to the bus 22. Furthermore, the intra-CPU controller 10 transmits to the second CPU 8 the data needed by the first CPU 7 in accessing hardware connected to the bus 22, the need for access being recognized while programs including the delivery program 20 in the memory unit 9 are being run by the first CPU 7. For example, the intra-CPU controller 10 acts when the second CPU 8 receives data entered from the console 12 and sent via the console controller 11, the intra-CPU controller then informing the first CPU 7 of what has been received by the second CPU 8. The intra-CPU controller 10 further acts when the first CPU 7 accesses hardware connected to the bus 22 during the run of a program in the memory unit 9, the intra-CPU controller then ordering the second CPU 8 to read relevant data from a specific disc drive in the disc unit 14.

Given an instruction from the computer 16, the computer communication processor 15 performs data processing for facsimile communication. The media converter 17 converts to binary information the image data composed of markings on the OMR sheet and of facsimile data.

Figure 4:
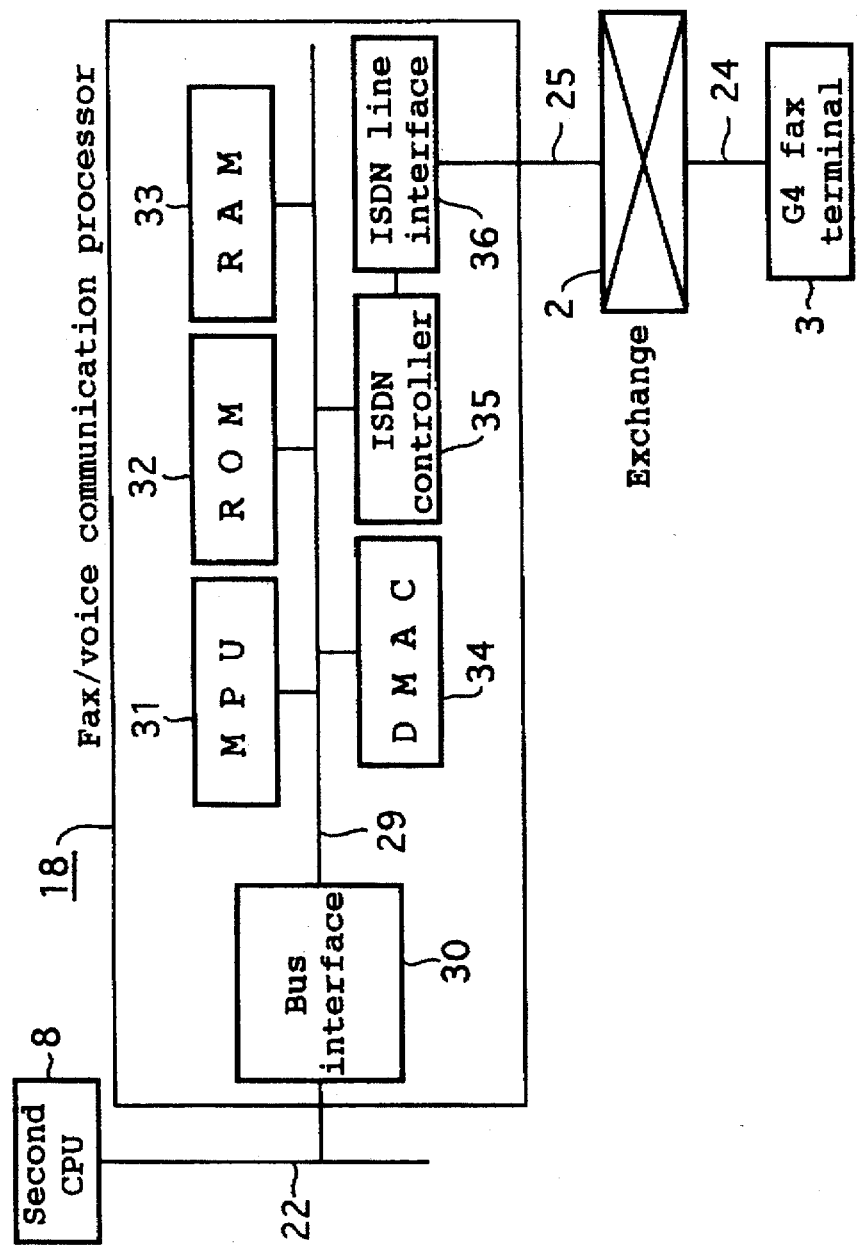
FIG. 4 is a block diagram of a fax/voice communication processor for digital processing included in FIG. 3.
Figure 5:
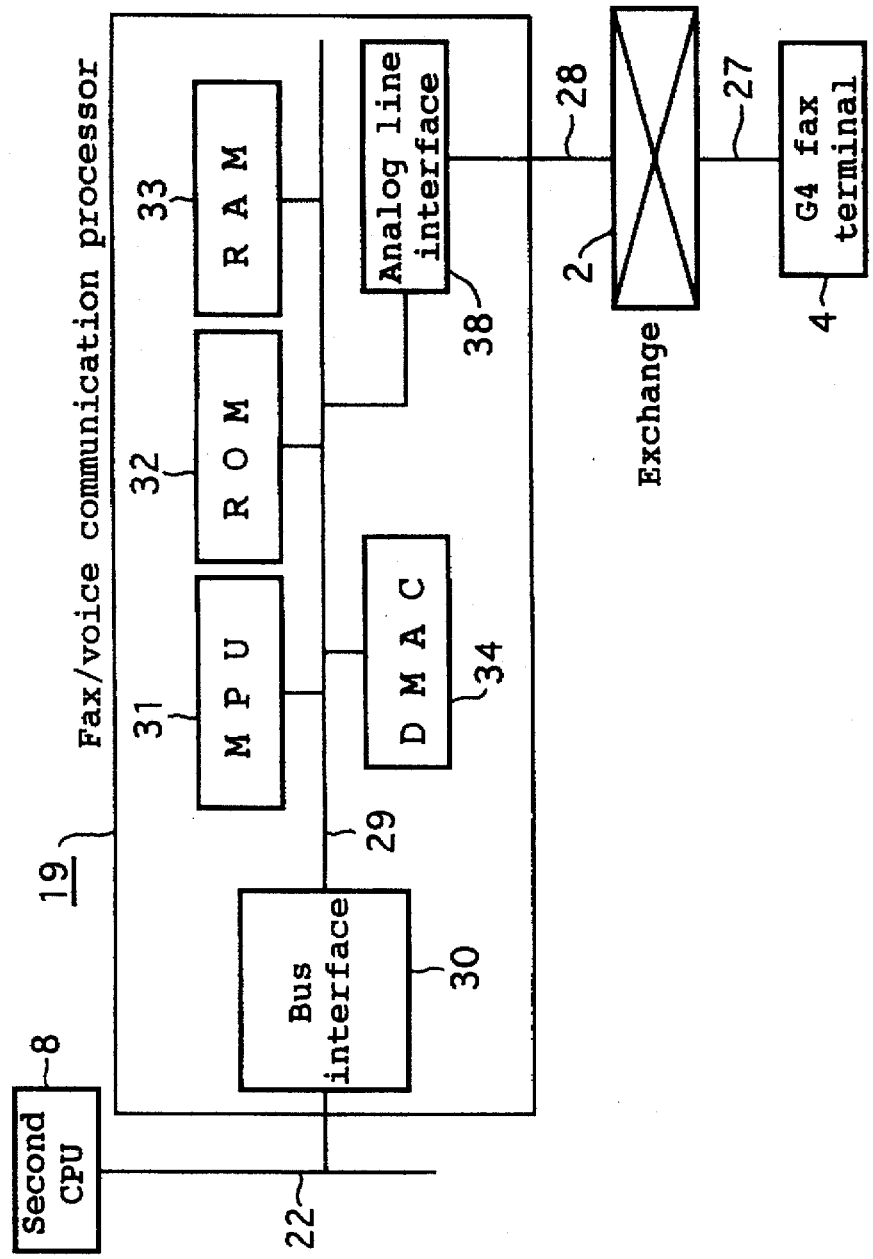
FIG. 5 is a block diagram of a fax/voice communication processor for analog processing included in FIG. 3.

The fax/voice communication processors 18 and 19 have a different internal structure depending on the type of the fax terminal (3, 4) connected via the exchange 2. FIG. 4 is a block diagram of the fax/voice communication processor 18 for digital processing included in FIG. 3, and FIG. 5 is a block diagram of the fax/voice communication processor 19 for analog processing. In the present example, the fax/voice communication processor 18 for digital processing in FIG. 4 is connected to a G4 mode fax terminal 3 via the exchange 2, and the fax/voice communication processor 19 for analog processing in FIG. 5 is connected to a G3 mode fax terminal 4 by way of the exchange 2.

Figure 6:
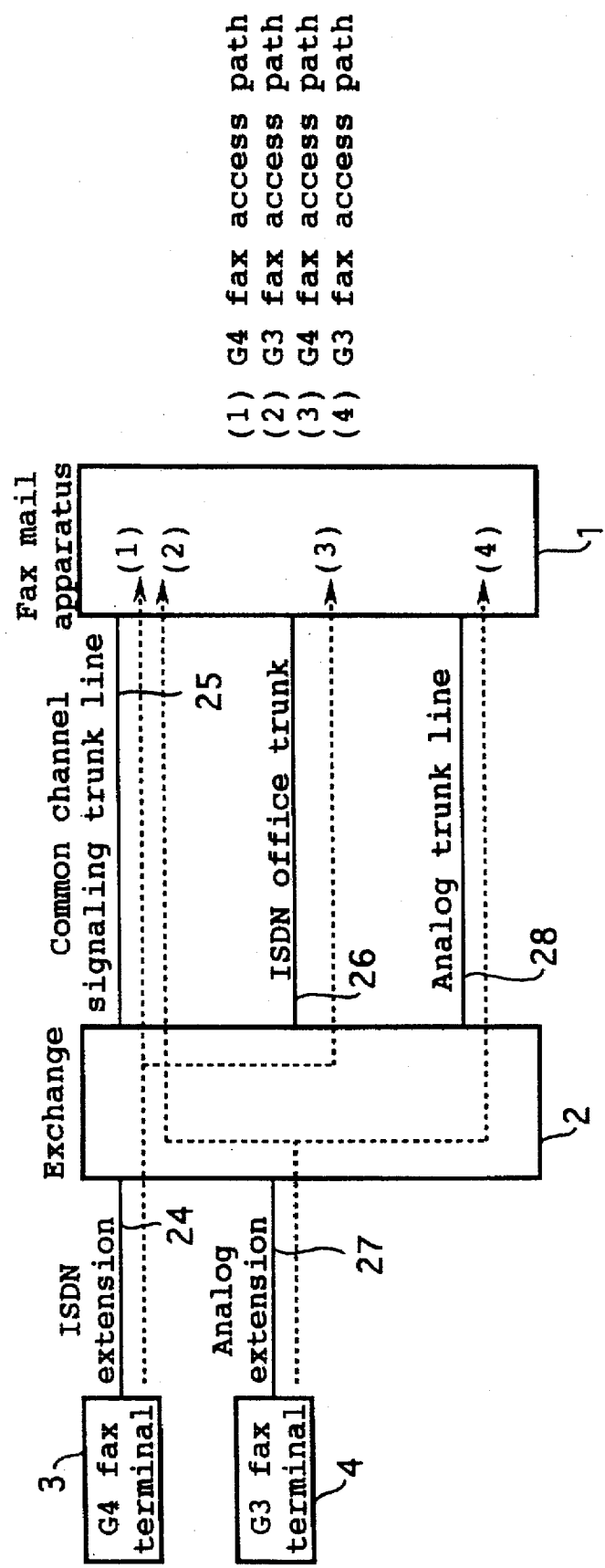
FIG. 6 is a schematic view showing how facsimile terminals are connected to a fax mail apparatus.

Described below with reference to FIG. 6 is how the G4 and G3 fax terminals 3 and 4 are connected via the exchange 2 to the fax/voice communication processors 18 and 19, respectively, in the fax mail apparatus 1. In FIG. 6, the fax/voice communication processors 18 and 19 are omitted. The G4 fax terminal 3 is connected to the exchange 2 by way of an ISDN (integrated services digital network) extension 24. From the exchange 2, the G4 fax terminal 3 is connected to the fax/voice communication processor 18 for digital processing in the fax mail apparatus 1 through one of two paths: through a common channel signaling trunk line 25 for transmitting both digital and analog signals between the exchange 2 and the fax mail apparatus 1, or through an ISDN office trunk 26.

The G3 fax terminal 4 is connected to the exchange 2 via an analog extension 27. From the exchange 2, the G3 fax terminal 4 is connected to the fax/voice communication processor 19 for analog processing in the fax mail apparatus 1 through one of two paths: through the common channel signaling trunk line 25 coupling the exchange 2 to the fax mail apparatus 1, or through an analog trunk line 28 working as per the analog trunking scheme. Specifically, the path indicated in broken lines (1) or (3) is a digital signal access path, and the path shown in broken lines (2) and (4) is an analog signal access path.

The fax/voice communication processor 18 thus connected to the G4 fax terminal 3 has the trunk line handling function of an exchange. As shown in FIG. 4, the fax/voice communication processor 18 comprises a bus interface 30 connecting the bus 22 of the second CPU 8 to an internal bus 29 of the communication processor 18; an MPU 31, a ROM 32, a RAM 33, a DMAC (direct memory access controller) 34 and an ISDN controller 35 which are all connected to the internal bus 29; and an ISDN line interface 36 connecting the G4 fax terminal 3 to the ISDN controller 35 via the exchange 2.

In accordance with the programs held in the ROM 32 and RAM 33, the MPU 31 transmits to the second CPU 8 the voice and fax information sent from the G4 fax terminal 3, and transmits the fax and voice information from the second CPU 8 to the G4 fax terminal 3. The ROM holds a diagnostic program of the fax/voice communication processor 18 and has a bootstrap function for loading appropriate programs from the second CPU 8 into the RAM 33. The RAM 33 accommodates a program for operating the fax/voice communication processor 18. The DMAC 34 carries out data transfer between the second CPU 8 and the ROM 32 or RAM 33 on a hardware basis without recourse to the MPU 31.

The ISDN controller 35 performs D channel data communication processing on the ISDN. The ISDN line interface 36 synchronizes the B and D channels at the lowest layer of the ISDN on a hardware basis. The fax/voice communication processor 18 of the above constitution functions so that the fax mail apparatus 1, viewed as a fax terminal by the exchange 2, may also be perceived as such by other exchanges. If a subscriber inputs incorrect information to make use of the mail service, the fax/voice communication processor 18 blocks the flow of the information to the fax mail apparatus 1 and gives the subscriber in question voice guidance to point out the erroneous input.

In operation, the subscriber at a G4 fax terminal 3 first inputs a special number, a mail function number and the destination party's telephone number to the exchange 2. The special number is a number allocated beforehand by the exchange to the fax mail apparatus. Given these numbers, the exchange 2 adds an originator identification number to the received information which is then sent to the fax/voice communication processor 18 by way of the ISDN line interface 36 and ISDN controller 35. The processing involved is handled by the MPU 31 in accordance with the programs in the ROM 32 and RAM 33. This allows the fax mail apparatus 1 to recognize the originator identification number, the mail function number and the destination party's telephone number and to carry out trunk line processing comparable to that of an exchange.

The fax/voice communication processor 19 coupled to the G3 fax terminal 4 for analog processing in FIG. 5 has a trunk line processing function similar to that of the fax/voice communication processor 18. The difference between the processors 18 and 19 is that the processor 19 has an analog line interface 38 whose purpose is twofold: to convert into digital format the originator identification number and other relevant numbers sent from the exchange 2 via the analog trunk line 28, and to convert the send signal to exchange 2 into analog format.

Figure 7:
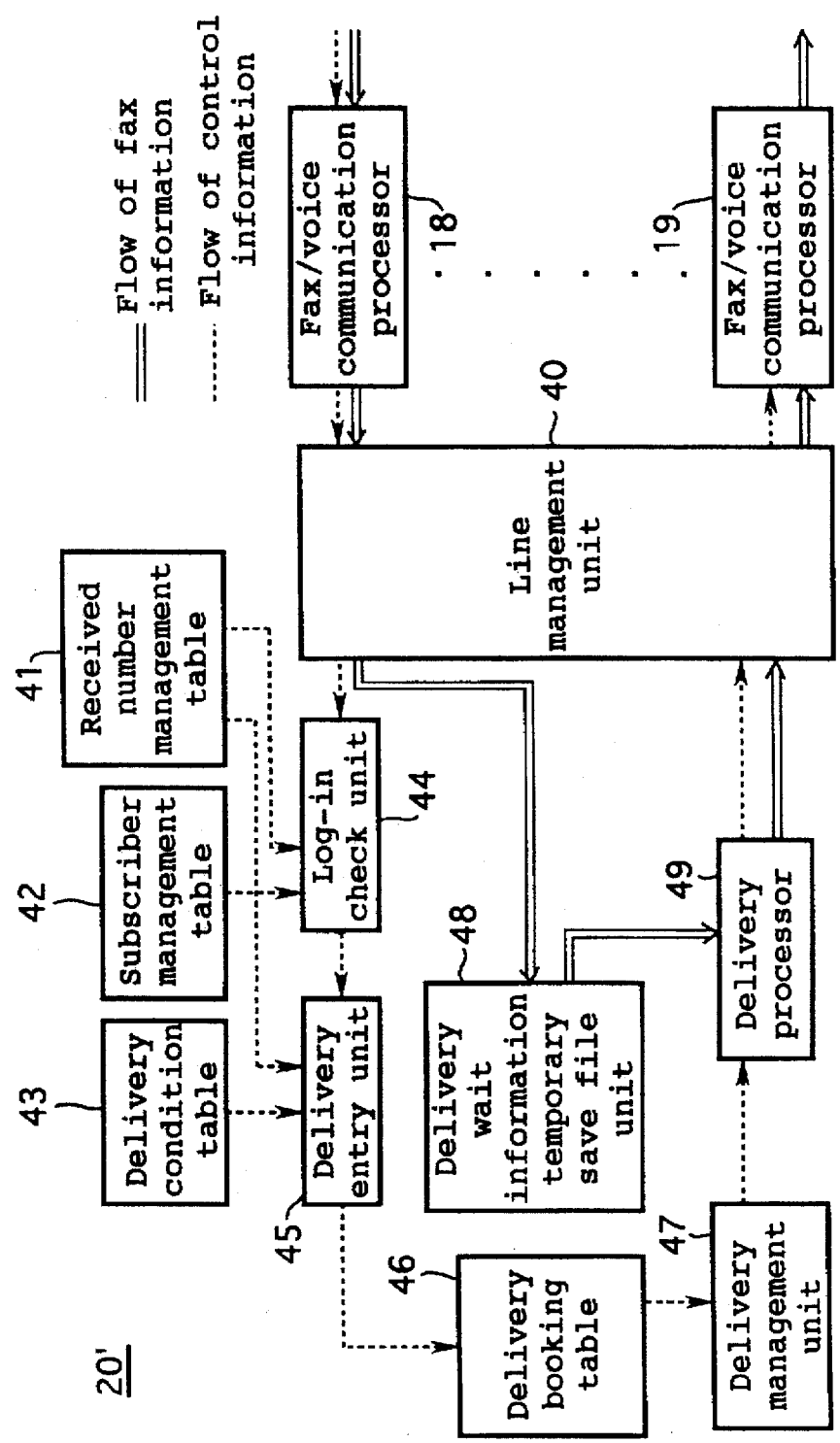
FIG. 7 is a block diagram of a setup in which hardware replaces the mail delivery process implemented by a delivery program stored in a memory unit shown in FIG. 3.

Described below with reference to FIG. 7 is the mail delivery processing performed by the delivery program 20. The delivery program 20 is executed by the second CPU 8 and the first CPU 7 receiving the originator identification number, mail function number and destination party's telephone number which the fax/voice communication processor 18 (or 19) received from the exchange 2 and recognized as such. FIG. 7 is a block diagram of a setup in which the mail delivery process implemented conceptually by the delivery program 20 is replaced by hardware (called mail delivery processing means 20'). In FIG. 7, double line arrows indicate the flow of fax information, and broken line arrows denote the flow of control information.

The mail delivery processing means 20' comprises a line management unit 40, a received number management table 41, a subscriber management table 42, a delivery condition table 43, a log-in check unit 44, a delivery entry unit 45, a delivery booking table 46, a delivery management unit 47, a delivery wait information temporary save file unit 48, and a delivery processor 49.

The line management unit 40 ascertains over which line the originator identification number, mail function number and destination party's telephone from the fax/voice communication processor 18 are transmitted. The line management unit 40 then forwards the received numbers to the log-in check unit 44, establishes a line connection, and informs the fax/voice communication processor 18 that the originator identification number, the mail function number and the destination party's telephone number have been received.

The received number management table 41 is used to covert the mail function number into a mail function code for internal processing. For example, if the received mail function number falls between 2xxx and 5xxx, that number is converted to a mail function code for individual transmission; the number falling between 6xxx and xxxx is converted to a mail function code for relayed individual transmission. If the mail function number is 0, the number is converted to a mail function code for individual transmission to a public fax terminal; if the number is 10, it is converted to a group number for broadcast transmission; if the number is 15, it is converted to a bulletin board number for entry into a bulletin board; if the number is 16, it is converted to a bulletin board number for retrieval from a bulletin board.

The subscriber management table 42 is used for four purposes: to check the originator identification number, to check the mail function code, to process accounting per subscriber, and to limit service usages per subscriber. The check on the mail function code is made to see which service is to be made available to the subscriber in accordance with the received code. The log-in check unit 44 converts the mail function code output from the line management unit 40 into the corresponding mail function code by referring to the received number management table 41. At the same time, the log-in check unit 44 references the subscriber management table 42 to see if the originator identification number and the destination party's telephone number have been registered as subscriber identification numbers. The log-in check unit 44 then checks to see if the mail function code corresponding to the referenced subscriber identification number allows the subscriber in question to make use of the requested service. When the checked results match, the log-in check unit 44 activates the delivery entry unit 45.

Given the originator's telephone number relayed by the exchange 2, the log-in check unit 44 may collect subscriber-wise service usage information corresponding to the mail function code. That is, subscriber-wise accounting may be processed without the input of an identification number from the subscriber. Furthermore, upon receipt of the originator's telephone number relayed by the exchange 2, the log-in check unit 44 may limit subscriber-wise service usages. That is, the relevant service is made available to individual subscribers without the input of identification numbers from them.

The delivery condition table 43 is used to designate one of three conditions—the transmitting party's condition, the receiving party's condition, and the condition defined by the fax mail apparatus—as the basis for selecting a delivery line. The delivery condition table 43 is also used to designate the number of times a transmission is repeated as well as the intervals at which the transmission is repeated. The delivery entry unit 45 refers to the received number management table 41 and the delivery condition table 43 to find out the designated condition for selecting the delivery line, the retransmission count and the retransmission intervals. The settings thus found are entered by the delivery entry unit 45 into the delivery booking table 46 as delivery booking information.

The delivery management unit 47 references the delivery booking table 46 using an interval timer to see if there exists any entry waiting for delivery. If such an entry is found, the delivery management unit 47 activates the delivery processor 49 and supplies it with the delivery booking information. The delivery wait information temporary save file unit 48 accommodates the fax information output from the line management unit 40 until an order is received from the delivery processor 49. In accordance with the delivery booking information, the delivery processor 49 requests the line management unit 40 to acquire a line. With a line acquired accordingly, the delivery processor 49 delivers the fax information from the file unit 48 to the specified destination party's fax terminal.

Figure 8:
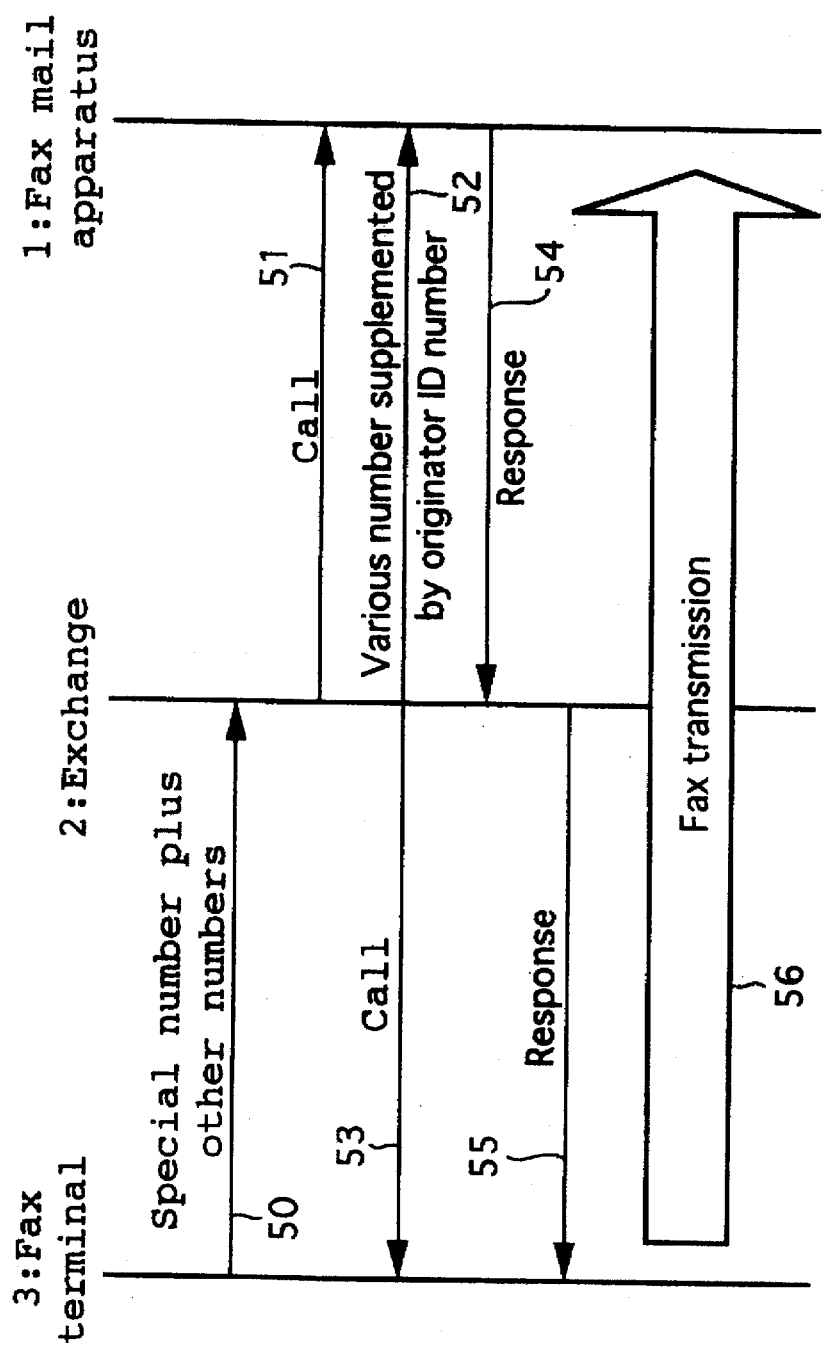
FIG. 8 is a sequence chart indicating how the inventive fax mail system operates.

How the fax mail system embodying the invention operates will now be described with reference to FIGS. 8 and 9. Referring to FIG. 8, the transmitting party enters using keys the special number, the mail function number and the destination party's telephone number from the fax terminal 3, as shown by reference numeral 50. These numbers are sent to the exchange 2 which adds the originator identification number to the received information. The exchange 2 then calls the fax mail apparatus 1 as indicated by reference numeral 51. When a line connection with the fax mail apparatus 1 is established, the exchange 2 transmits the originator identification number and other relevant numbers (mail function number and destination party's telephone number) to the fax mail apparatus 1, as indicated by reference numeral 52. At the same time, the exchange 2 sends a calling voice signal to the fax terminal 3 as shown by reference numeral 53.

Figure 9:
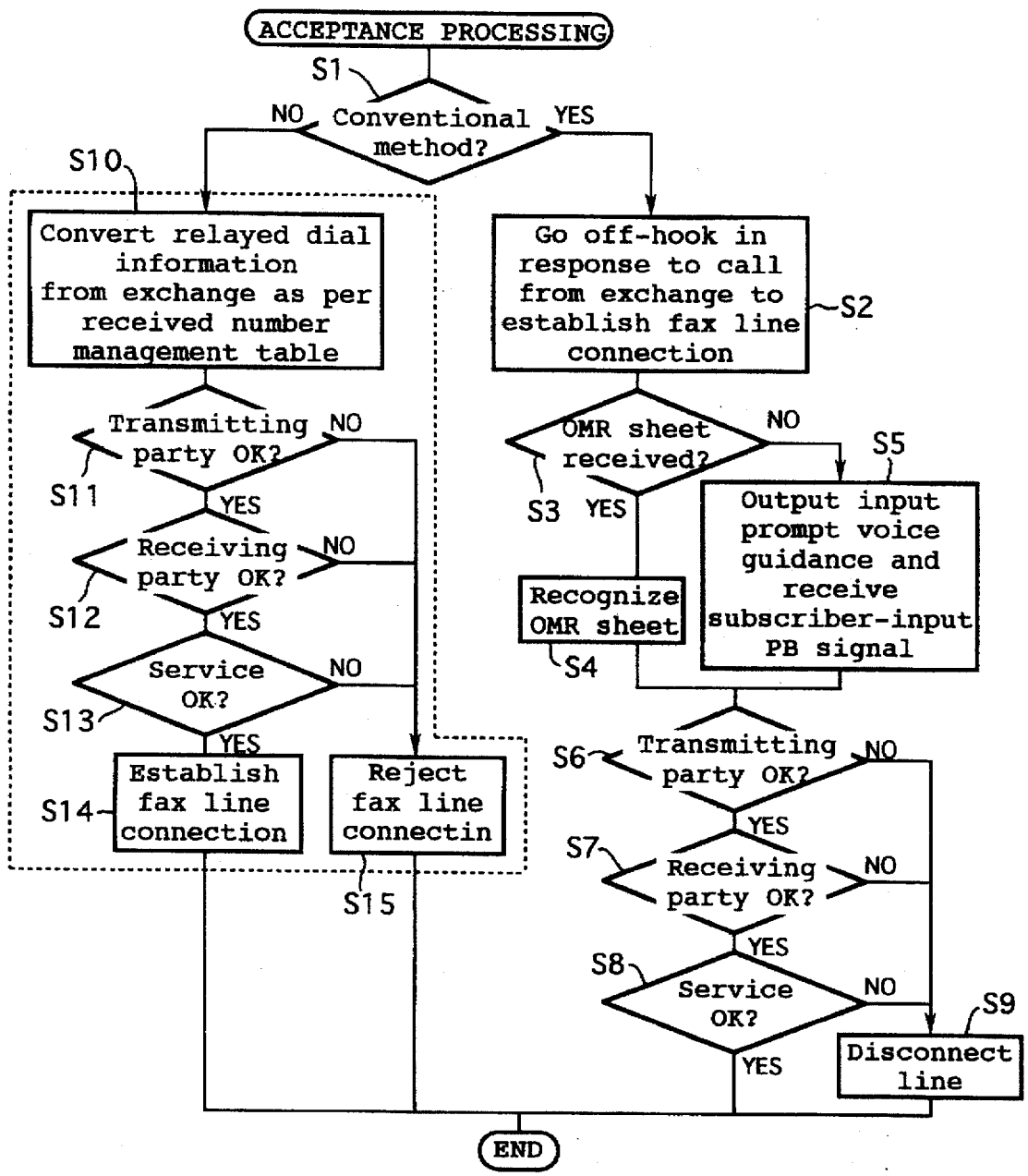
FIG. 9 is a flowchart of steps in which a fax mail apparatus in the inventive fax mail system operates.

On receiving the originator identification number and other numbers, the fax mail apparatus 1 carries out acceptance processing as shown in the flowchart of FIG. 9. The acceptance processing proceeds as follows: In step 1, a check is made to see if the convention method is to be used. If the conventional method is selected, step 2 is reached. In step 2, the fax mail apparatus 1 goes off-hook in response to a call from the exchange 2 to establish a fax line connection. Specifically, the fax mail apparatus 1 establishes a line connection with the fax terminal having the specified destination party's telephone number when called up by the exchange 2. In step 3, a check is made to see if an OMR sheet is received. If the OMR sheet is found to be received in step 3, step 4 is reached in which the OMR sheet is recognized. If no OMR sheet is found to be received in step 3, step 5 is reached. In step 5, the fax mail apparatus 1 outputs an input prompt voice guidance and receives a subscriber-input PB signal.

In step 6, a check is made to see if the transmitting party's conditions such as the originator identification number are met on the basis of the subscriber management table 42 of FIG. 7. If the conditions are met in step 6, step 7 is reached. In step 7, the receiving party's conditions such as a recipient identification number are met. If the conditions are met in step 7, step 8 is reached. In step 8, a check is made to see if the mail delivery service is available. In case the result of any of the decisions in steps 6, 7 and 8 turns out to be negative ("NO"), step 9 is reached in which the line is disconnected.

If the mail delivery service is found to be available in step 8, the fax mail apparatus 1 gives a service-available response to the exchange 2 as indicated by reference numeral 54 in FIG. 8. In turn, the exchange 2 sends its response to the fax terminal 3 as shown by reference numeral 55. In reply, the subscriber at the fax terminal pushes the facsimile start button to execute fax transmission as indicated by reference numeral 56.

Meanwhile, if the conventional method is not selected in step 1, i.e., if the above-described embodiment is selected instead, then step 10 is reached. In step 10, relayed dial information from the exchange 2 (originator identification number, mail function number and destination party's telephone number) is converted to a mail function code for internal processing as part of a conventional number system based on the received number management table 41 in FIG. 7.

In step 11, as in step 6, a check is made to see if the transmitting party's conditions such as the originator identification number are met. If the conditions are met in step 11, step 12 is reached. In step 12, as in step 7, a check is made to see if the receiving party's conditions such as delivery-related conditions are met. If the conditions are met in step 12, step 13 is reached. In step 13, as in step 8, a check is made to see if the mail delivery service is available. In case the result of any of the decisions in steps 11, 12 and 13 turns out to be negative ("NO"), step 15 is reached in which the line connection to the fax terminal 3 is rejected.

If the mail delivery service is found to be available in step 13, the fax mail apparatus 1 gives a service-available response to the exchange 2 as indicated by reference numeral 54 in FIG. 8. In turn, the exchange 2 sends its response to the fax terminal 3 as shown by reference numeral 55. In reply, the subscriber at the fax terminal pushes the facsimile start button to execute fax transmission as indicated by reference numeral 56.

Figure 10:
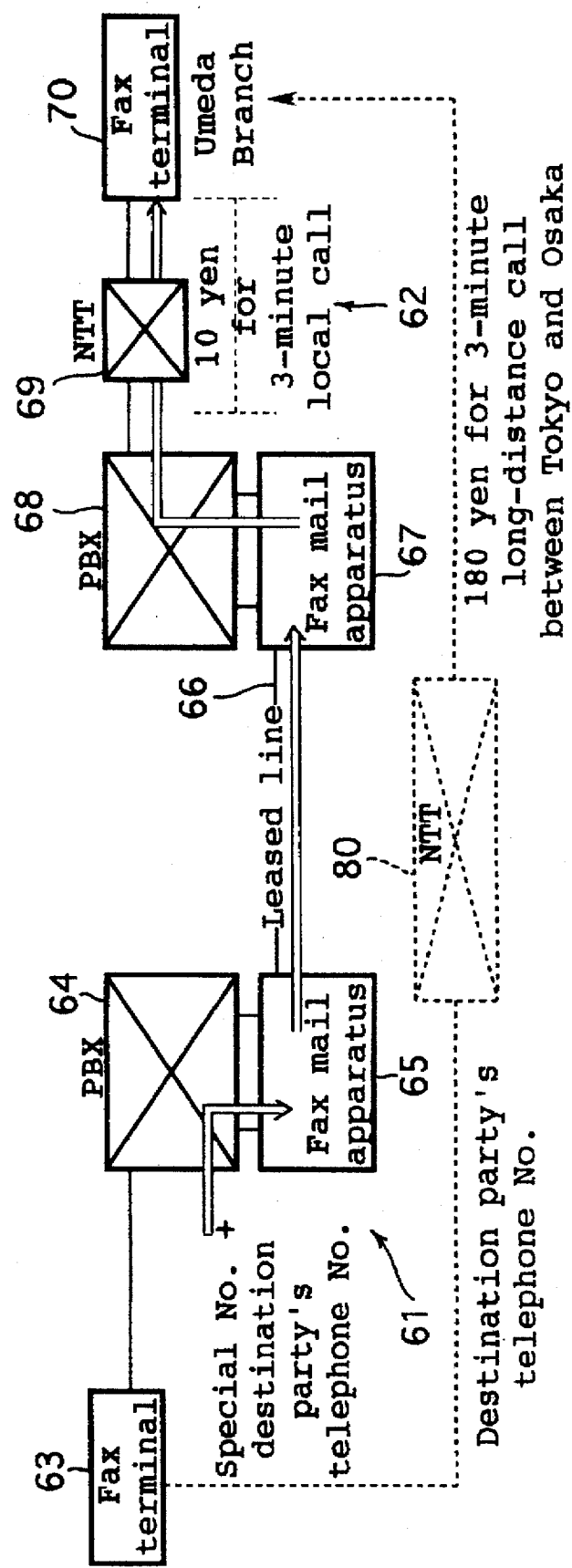
FIG. 10 is a schematic view of a typical application in which the inventive fax mail system is established.

How the fax mail system embodying the invention is used in a typical application will now be described with reference to FIG. 10. FIG. 10 is a block diagram of a fax mail system as it is set up illustratively to provide fax communication between a Tokyo Office 61 and an Osaka Office 62.

At the Tokyo Office 61, a fax terminal 63 is connected to a fax mail apparatus 65 via a private branch exchange (PBX) 64. At the Osaka Office 62, its PBX 68 is connected to a fax terminal 70 of its Umeda Branch over a public network and by way of an exchange 69 of a common carrier (Nippon Telegraph and Telephone Corp., or NTT). The PBX 68 is connected further to a fax mail apparatus 67 of the Osaka Office. The fax mail apparatuses 65 and 67 of the two offices are interconnected through the use of the company's leased line 66.

In such a setup, suppose that the fax terminal 63 transmits fax information to the fax terminal 70. In that case, the user at the fax terminal 63 enters using keys the special number, the mail function number and the destination party's telephone number. Upon receipt of an acknowledgement, the user simply pushes the fax start button. If it takes three minutes to complete the transmission, the telephone charge involved here is only 10 yen, i.e., the minimum local call charge of the public network connecting the exchange 69 to the fax terminal 70. If an NTT exchange is involved in connecting the fax terminals 63 and 70 as shown in broken lines 80, a three-minute call amounts to as high as 180 yen. That is, where the in-house fax mail system is employed, as much as 170 yen can be saved on every three-minute call.

Such fax mail apparatuses as those (65, 67) shown in FIG. 10 may be installed for the following purposes: to reduce the cost of fax communication; to eliminate the need for retransmission when the line of the other party is busy or its terminal is jammed; to transmit the same information to many parties in the shortest possible time; to minimize any changes in fax-related operations after the installation of a fax mail system (no special sheet should be used and few operations should be added); and to avoid furnishing the fax terminal with an attachment for mail access procedure substitute processing in view of operation management and cost control.

As described, the fax mail system according to the invention requires a user at a G3 mode fax terminal to perform only a small number of input operations for utilizing the mail service of the fax mail apparatus. This means that with no operating manuals at hand, the user can make use of the service without committing operation errors. The limited number of input operations translates into a shortened time required to request the service. Where the DP (dial pulse) line is in use, there is no need to switch to tone signal generation. With no OMR sheet employed, the time for transmitting the extra sheet of document is eliminated. Users need not to worry about blurred or smeared markings on the sheet or its poor setting resulting in a failed attempt to make the mail service request.

In a setup where users at G4 mode fax terminals utilize the mail service of the fax mail apparatus, half-tone transmissions in which dot roughness is changed for density gradation are no longer troubled by the failure of some fax terminal models to recognize the OMR sheet markings converted to dot or mosaic format. The inventive fax mail system eliminates the need for G4 model fax terminals specialized for mail access and operating according to particular communication protocols. That is, all G4 mode fax terminals irrespective of their models are allowed to make use of the mail service of the fax mail apparatus.

As many apparently different embodiments of this invention may be made without departing from the spirit and scope thereof, it is to be understood that the invention is not limited to the specific embodiments thereof except as defined in the appended claims.

What is claimed is:

1. A facsimile mail system including a plurality of subscriber terminals, a facsimile mail apparatus and an exchange for connecting said subscriber terminals to said facsimile mail apparatus, said facsimile mail system comprising:

adding means attached to said exchange, for adding an originator identification number to necessary information about a mail service entered from one of said subscriber terminals in response to a connection request from said one subscriber terminal;

transmitting means, attached to said exchange, for transmitting to said facsimile mail apparatus said necessary information about said mail service supplemented with said originator identification number;

converting means attached to said facsimile mail apparatus, for converting said necessary information coming from said exchange into a mail function code for internal processing; and connecting means, attached to said exchange, for connecting said one subscriber terminal to said facsimile mail apparatus upon receipt of a connection enable response sent from said facsimile mail apparatus.

2. A facsimile mail system according to claim 1, wherein said necessary information about said mail service comprises a number allocated to said facsimile mail apparatus, a mail function number, and a telephone number of a destination party.

3. A facsimile mail system according to claim 2, wherein said converting means includes a first table accommodating information by which to convert said mail function number into said mail function code for internal processing, and log-in check means for converting said mail function number into said mail function code by referencing said first table.

4. A facsimile mail system according to claim 1, wherein said exchange and said facsimile mail apparatus are connected so that said necessary information about said mail service entered from said one subscriber terminal and said originator identification number furnished by said exchange are transferred from said exchange to said facsimile mail apparatus through a trunk of said exchange.

5. A facsimile mail system according to claim 3, further comprising a second table accommodating information by which to check said originator identification number and said mail function code.

6. A facsimile mail system according to claim 5, wherein said second table includes a first function program for performing subscriber-wise accounting processing, and wherein said log-in check means collects, on the basis of said first function program, originator-wise service usage information corresponding to said mail function code and in accordance with the originator's telephone number relayed by said exchange, whereby said subscriber-wise accounting processing is carried out without the input of a subscriber identification number.

7. A facsimile mail system according to claim 5, wherein said second table includes a second function program for limiting subscriber-wise individual service usages, and wherein said log-in check means limits, on the basis of said second function program, said subscriber-wise individual service usages in accordance with the originator's telephone number relayed by said exchange, whereby subscriber-wise individual services are employed without the input of a subscriber identification number.

* * * * *